US009275041B2

(12) United States Patent
Ghosh et al.

(10) Patent No.: US 9,275,041 B2
(45) Date of Patent: Mar. 1, 2016

(54) PERFORMING SENTIMENT ANALYSIS ON MICROBLOGGING DATA, INCLUDING IDENTIFYING A NEW OPINION TERM THEREIN

(75) Inventors: Riddhiman Ghosh, Sunnyvale, CA (US); Lei Zhang, Chicago, IL (US); Mohamed E. Dekhil, Santa Clara, CA (US); Bing Liu, Winnetka, IL (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 1028 days.

(21) Appl. No.: 13/280,031

(22) Filed: Oct. 24, 2011

(65) Prior Publication Data

US 2013/0103385 A1   Apr. 25, 2013

(51) Int. Cl.
G06F 17/27 (2006.01)
G06F 17/30 (2006.01)
G06Q 30/02 (2012.01)
G06N 99/00 (2010.01)

(52) U.S. Cl.
CPC ........ *G06F 17/2785* (2013.01); *G06F 17/3071* (2013.01); *G06N 99/005* (2013.01); *G06Q 30/02* (2013.01)

(58) Field of Classification Search
CPC ............ G06F 17/30707; G06F 17/30719; G06Q 30/02; G06Q 30/0201; G06N 99/005
USPC .......................................................... 704/9
See application file for complete search history.

(56) References Cited

U.S. PATENT DOCUMENTS

| 6,892,189 | B2* | 5/2005 | Quass | G06F 17/30893 701/1 |
| 7,512,582 | B2* | 3/2009 | Cao | G06N 7/02 706/52 |
| 7,523,085 | B2 | 4/2009 | Nigam et al. | |
| 8,170,868 | B2* | 5/2012 | Gamon | G06F 17/27 704/1 |
| 2006/0069589 | A1* | 3/2006 | Nigam et al. | 705/1 |
| 2008/0249764 | A1* | 10/2008 | Huang | G06F 17/2785 704/9 |
| 2008/0270116 | A1 | 10/2008 | Godbole et al. | |
| 2009/0048823 | A1* | 2/2009 | Liu | G06F 17/2765 704/9 |
| 2009/0125371 | A1* | 5/2009 | Neylon et al. | 705/10 |

(Continued)

FOREIGN PATENT DOCUMENTS

CN          101609459 A          12/2009

OTHER PUBLICATIONS

Dang, "A Lexicon-Enhanced Method for Sentiment Classification: An Experiment on Online Product Reviews", IEEE Intelligent Systems, 2010.*

(Continued)

*Primary Examiner* — Jialong He
(74) *Attorney, Agent, or Firm* — Michael A. Dryja (57) ABSTRACT

There is provided a computer-implemented method of performing sentiment analysis. An exemplary method comprises performing a first sentiment analysis on microblogging data based on a method using an opinion lexicon. The method also includes training a classifier using training data from the first sentiment analysis. Additionally, the method includes identifying a new opinion term in the microblogging data by performing a statistical test. The new opinion terms are not in the opinion lexicon. The method also includes identifying new microblogging data based on the new opinion term. Further, the method includes performing a second sentiment analysis on the new microblogging data using the classifier.

15 Claims, 6 Drawing Sheets

(56) References Cited

U.S. PATENT DOCUMENTS

| | | | |
|---|---|---|---|
| 2009/0164417 A1* | 6/2009 | Nigam | G06Q 30/02 |
| 2009/0193011 A1* | 7/2009 | Blair-Goldensohn et al. | 707/5 |
| 2009/0193328 A1* | 7/2009 | Reis et al. | 715/231 |
| 2009/0319518 A1 | 12/2009 | Koudas et al. | |
| 2011/0093417 A1* | 4/2011 | Nigam | G06Q 30/02 706/12 |
| 2011/0112995 A1* | 5/2011 | Chang et al. | 706/12 |
| 2011/0252036 A1* | 10/2011 | Neylon et al. | 707/739 |
| 2012/0259616 A1* | 10/2012 | Peng et al. | 704/9 |
| 2012/0271788 A1* | 10/2012 | Fang et al. | 706/50 |
| 2013/0091117 A1* | 4/2013 | Minh | 707/709 |
| 2013/0103623 A1* | 4/2013 | Burstein et al. | 706/12 |

OTHER PUBLICATIONS

Tan et al. "Combining Learn-based and Lexicon-based Techniques for Sentiment Detection without Using Labeled Examples", Proceeding SIGIR '08 Proceedings of the 31st annual international ACM SIGIR conference on Research and development in information retrieval, pp. 743-744, 2008.*

Chew et al. "Pandemics in the Age of Twitter: Content Analysis of Tweets during the 2009 H1N1 Outbreak", [Online], http://journals.plos.org/plosone/article?id=10.1371/journal.pone.0014118#pone-0014118-g015, published Nov. 29, 2009.*

Pak et al. "Twitter for Sentiment Analysis: When Language Resources Are Not Available", International Workshop on Database and Expert Systems Applications, 2011.*

Melville, Prem, et al., "Sentiment Analysis of Blogs by Combining Lexical Knowledge With Text Classification", KDD '09, ACM, Jun. 28-Jul. 1, 2009, Paris, France, pp. 9, English.

Mishne, Gilad, "Multiple Ranking Strategies for Opinion Retrieval in Blogs", The University of Amsterdam at the 2006 TREC Blog Track, pp. 1-4, English.

Lu, Bin, et al., "Combining a Large Sentiment Lexicon and Machine Learning for Subjectivity Classification", Machine Learning and Cybernetics ICMLC), 2010 International Conference, Jul. 11-14, 2010; vol. 6, pp. 3311-3316, Qingdao, English.

Waltinger, Ulli, "GermanPolarityClues: A Lexical Resource for German Sentiment Analysis", Proceedings of the Seventh Conference on International Language Resources and Evaluation (LREC'10), May 19-21, 2010, pp. 1638-1642, European Language Resources Association (ELRA), English.

* cited by examiner

PERFORMING SENTIMENT ANALYSIS ON MICROBLOGGING DATA, INCLUDING IDENTIFYING A NEW OPINION TERM THEREIN

BACKGROUND

Sentiment analysis is the computational study of people's opinions, appraisals, and emotions toward entities (e.g. products for sale, organizations, events and individuals). A growing online source of public opinion is the microblog. Microblogs are short web blogs, and are often posted on social media websites (e.g. FACEBOOK® and TWITTER®). People may provide, in microblogs, personal statuses, tweets, comments, etc. Opinions mined from microblogs may provide advantageous insights into public sentiments on various entities.

However, it may be difficult to identify and determine opinions for entities effectively using this class of data. Microblogs are typically short. For example, a tweet, which is a post on the TWITTER® network, is currently limited to a maximum of 140 characters. The data sources may also be noisy and prone to spam. Another issue is that opinions are commonly expressed in a manner specific to the domain, thereby incorporating emoticons, colloquial expressions, abbreviations, acronyms, neologisms, etc. These characteristics may increase the computational complexity of sentiment analysis on microblogs.

BRIEF DESCRIPTION OF THE DRAWINGS

Certain examples of embodiments are described in the following detailed description and in reference to the drawings, in which.

DETAILED DESCRIPTION

One approach to perform sentiment analysis on entities in microblogging data is machine learning-based method. That is, we train a sentiment classifier to determine positive, negative and neutral sentiments. The method has been used for sentiment classification of documents or sentences. However, it is not easy to be applied for mining opinion on entities in microblogging data. Firstly, manual labeling of a large set of microblog training examples for a classifier is labor-intensive and time-consuming. Secondly, manual labeling often needs to be done for each application domain. It is not scalable for microblogging data which covers almost all domains as people can express opinions about anything on microblogs.

Another approach to perform sentiment analysis on microblogging data is based on a function of opinion words in context. Opinion words are also known as opinion-bearing words or sentiment words. Positive opinion words are used to express some desired states while negative opinion words are used to express some undesired states. Examples of positive opinion words are "good" "wonderful" and "amazing". Examples of negative opinion words are "bad", "poor" and "terrible". The approach generally uses a dictionary of opinion words to identify and determine positive, negative and neutral sentiments. The dictionary of opinion words is called the opinion lexicon. The approach of using opinion words (the lexicon) to determine opinion orientations is called lexicon-based method. However, the microblog has developed its own characteristics. For example, emoticons, colloquial expressions, abbreviations, etc. are frequently used in microblogs. These expressions may possess sentiment orientations but they do not exist in a general opinion lexicon. It may lead to low recall for lexicon-based method.

Furthermore, the lexicon-based method may not take into account the context within which positive or negative words appear or not. For example, a user may write a microblog, "What is the best HP® desktop computer?" The lexicon-based methods may recognize the opinion word "best" and determine that this user is expressing a positive opinion about HP® desktops. However, the user is simply asking a question and is not indicating an opinion. In another context, people may express opinions without using the opinion words in the opinion lexicon. For example, a microblog, "I wanna see the movie, Inception." It indicates a positive opinion of the movie. Because no opinion words from the opinion lexicon appear in the microblog, the lexicon-based methods may miss the positive comment. Many opinion words are also domain-specific. In some cases, multiple words with opposite polarities may appear in the same sentence, making it challenging to determine an opinion of an entity in the overall statement.

In one embodiment, sentiment analysis on microblogs may be performed by applying a hybrid method by combining the opinion lexicon and sentiment classifier. In this way, sentiment orientations may be determined on entities discussed in microblogs.

Figure 1:
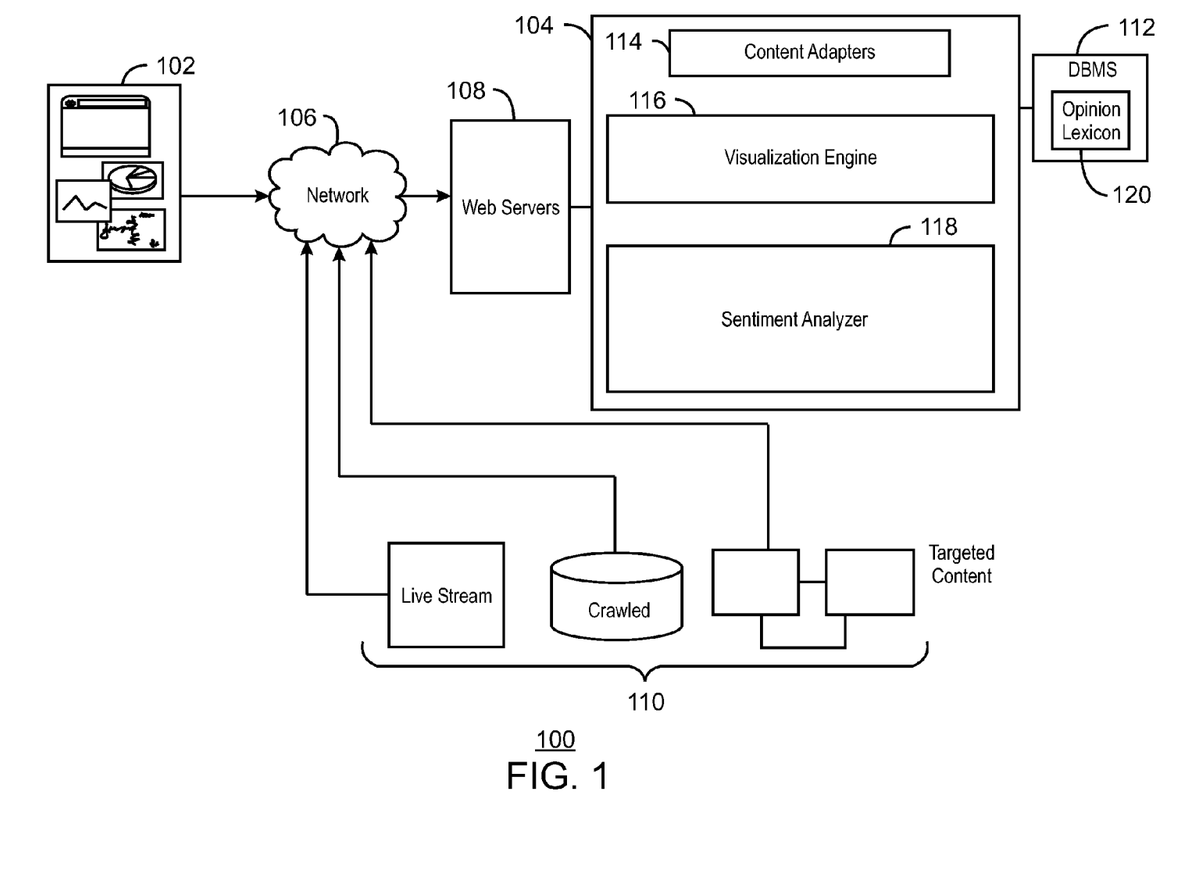
FIG. 1 is a block diagram of a system for sentiment analysis, according to an embodiment of the present techniques.

FIG. 1 is a block diagram of a system 100 for sentiment analysis, according to an embodiment of the present techniques. The system 100 includes various clients 102 and an application server 104, in communication over a network 106 and web servers 108. The clients 102 may include various computing devices, including mobile devices, among others. The clients 102 may display opinion data using various user interfaces, such as widgets, dashboards, graphical user interfaces (GUI), browser clients, etc. The application server 104 may perform sentiment analysis on microblogging data 110 from various sources. Sentiment analysis may be invoked by the clients 102 through web service invocation interfaces on the web servers 108. The microblog sources may include live streams, crawled content, and targeted content. The crawled content may be aggregated. The application server 104 may use a database management system (DBMS) 112 to perform the sentiment analysis on the microblogging data 110. The DBMS 112 may include an opinion lexicon 120, identifying an initial set of opinion words. Each of these opinion words, such as "bad," and, "good," may be assigned an opinion polarity, e.g., positive or negative. The application server 104 may include content input adapters 114, a visualization engine 116, and a sentiment analyzer 118. The content adapters 114 may include adapters for Comma Separated Value files, or other format files, TWITTER®, review sites, adapter plugins, etc. The visualization engine 116 may provide visualizations of opinion, for display on the various clients 102. The visualization engine 116 may use visual analytics, server-side plotting and graphics, and bitmap rendering to generate the visualizations. The sentiment analyzer 118 may determine opinion polarities on entities discussed in each microblog from the various sources. The opinions for each of these entities may be stored in the DBMS 112 for use by the visualization engine 116. The sentiment processor 118 may include a pre-processor and data cleanser, a natural language processor, a domain-specific lexicon builder, and a sentiment polarity assignment engine. The pre-processor may filter out spam, duplicate microblogs, etc. The natural language processor may identify part-of-speech (POS) tag for each word or token in the microblogs. The domain-specific lexicon builder may determine polarity for domain-specific opinion word. The sentiment polarity assignment engine may determine the opinions for entities in each sentence in the microblogs.

Figure 2:
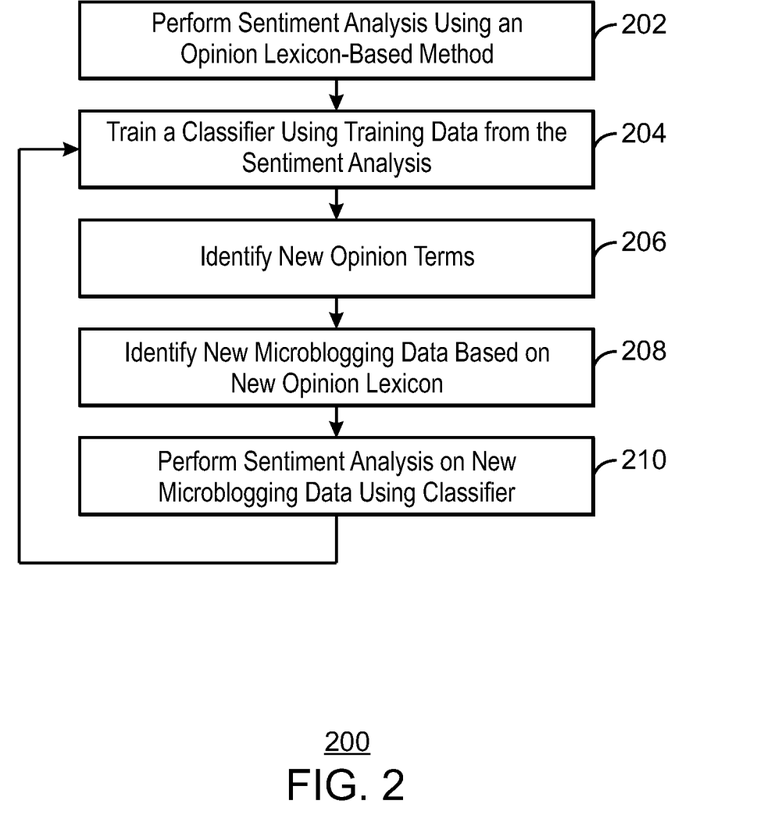
FIG. 2 is a process flow diagram showing a computer-implemented method for sentiment analysis according to an embodiment of the present techniques.

FIG. 2 is a process flow diagram showing a computer-implemented method 200 for sentiment analysis according to an embodiment of the present techniques. The method 200 may be performed by the sentiment analyzer 118. It should be understood that the process flow diagram is not intended to indicate a particular order of execution. The method begins at block 202, where the sentiment analyzer performs sentiment analysis on microblogging data 110 using an opinion lexicon-based method. The sentiment analysis may identify a sentiment polarity for each sentence in the microblogging data.

The sentiment analysis may also produce training data. At block 204, the sentiment analyzer 118 may train a classifier using training data generated by the sentiment analysis at block 202.

At block 206, the sentiment analyzer 118 may identify new opinion terms in the microblogging data 110 by performing a statistical test. These new opinion terms may be added to the opinion lexicon 120. At block 208, the updated opinion lexicon 120 may be used to identify new, opinionated microblogging data. At block 210, the sentiment analyzer 118 may perform a sentiment analysis on the newly identified microblogging data using the classifier. In some cases, the sentiment analysis performed at block 202 may not be able to determine a sentiment for one or more sentences from the microblogging data 110. In such cases, the classifier may perform sentiment analysis on these sentences at block 210. Blocks 204-210 may be successively repeated, unsupervised, to grow the opinion lexicon 120, and improve the training of the classifier.

Figure 3:
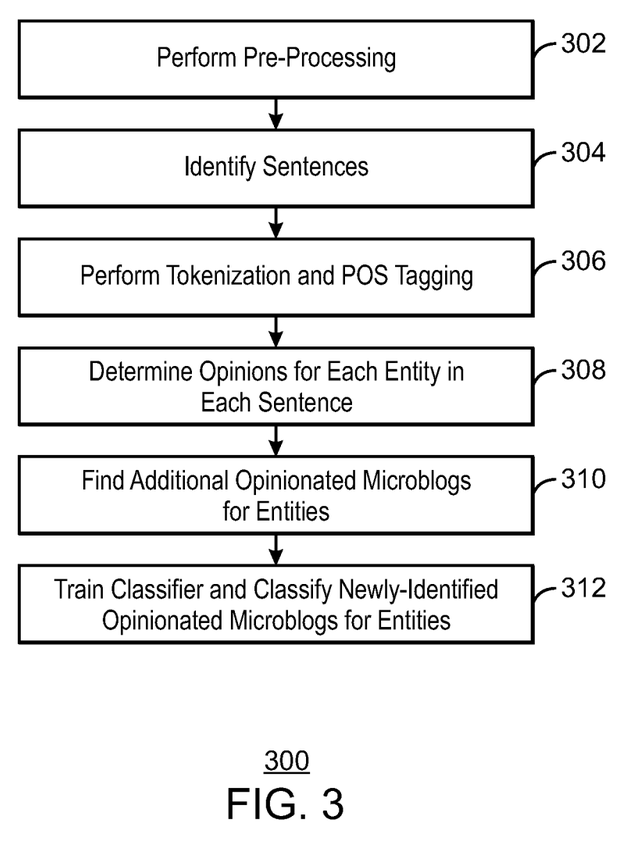
FIG. 3 is a process flow diagram showing a computer-implemented method for sentiment analysis according to an embodiment of the present techniques.

FIG. 3 is a process flow diagram showing a computer-implemented method 300 for sentiment analysis according to an embodiment of the present techniques. The method 300 may be performed by the sentiment analyzer 118. It should be understood that the process flow diagram is not intended to indicate a particular order of execution.

The method 300 represents the method 200 in more detail. The method 300 may begin at block 302, where the sentiment analyzer 118 may perform pre-processing on the input microblogs. The pre-processing may filter out noisy data, such as spam. For example, spam tweets may share the same author, content, and tweet structure. Duplicated data, such as re-tweets, may also be filtered out in the pre-processing. In the pre-processing, popular abbreviations included in the original microblog are expanded to their full form. For example, the abbreviation, "wknd," frequently used in microblogs, may be expanded to, "weekend." In one embodiment, the DBMS 112 may include a dynamic lexicon of known abbreviations, and their corresponding full forms.

At block 304, the sentiment analyzer 118 may identify the sentences in each microblog. Sentences may be identified through customary boundaries, including punctuation, such as, periods, question marks, etc. Heuristic language rules may be used to find sentence boundaries.

At block 306, the sentiment analyzer 118 may perform tokenization and part-of-speech tagging on each of the sentences. In tokenization, each sentence may be further divided into tokens. Each of the tokens may then be tagged with the part-of-speech the token represents, e.g., nouns, adjectives, pronouns, etc.

At block 308, the sentiment analyzer 118 may determine the opinions on entities discussed in a microblog. The opinions on the entities may be determined based on the sentiment polarities of opinion words, and the relationships between the entities and the opinion words. The opinion words, and their associated sentiment polarities, may be identified using the opinion lexicon 120. The relationships may be identified using various approaches. In one approach, the relationships are determined using syntactic sentence structure, or dependency grammar; in another approach, the relationships may be based on the distance between an opinion word and entity; or both. For example, relationships may be identified between the entity and its closest opinion word. Based on the relationships the entities have with opinion words, and the sentiment polarity of those opinion words, the sentiment analyzer 118 may determine a sentiment polarity for each entity.

In some scenarios, the microblogs may include opinion words that are not included in the opinion lexicon 120. This may be due to domain-specific opinion terms such as emoticons, colloquial expressions, neologisms and so on. As such, some amount of opinion data may not be considered when the sentiment analyzer 118 determines opinions, as described above. At block 310, to improve recall, domain-specific opinion terms and additional microblogs that are likely to be opinionated are identified automatically by using the information in the result of block 308. In one embodiment, the domain-specific opinion terms are identified by Pearsons chi-square test first. The Pearsons chi-square test can be used to determine the strength of a relationship between an opinion term f (word or token), with respect to a positive or negative opinion. The larger the chi-square value, the more class-dependent f is with respect to a positive or negative class. In one embodiment, a threshold for this class-dependency may be specified. Based on the newly identified domain-specific opinion terms, we can extract additional opinionated microblogs from data sources. If a microblog contains one or more domain-specific opinion terms, we can regard such microblog opinionated. Accordingly, a sentiment classifier capturing domain-specific knowledge is trained. In one embodiment, the classifier may be a support vector machine (SVM). The training examples for SVM are given by the result of block 308. The output of training the SVM may be a classification model that may be used to determine sentiment orientation newly-identified opinionated microblogs in block 309. The classification model is used to assign polarities to entities in microblogs which cannot be determined by lexicon-based method.

Figure 4:
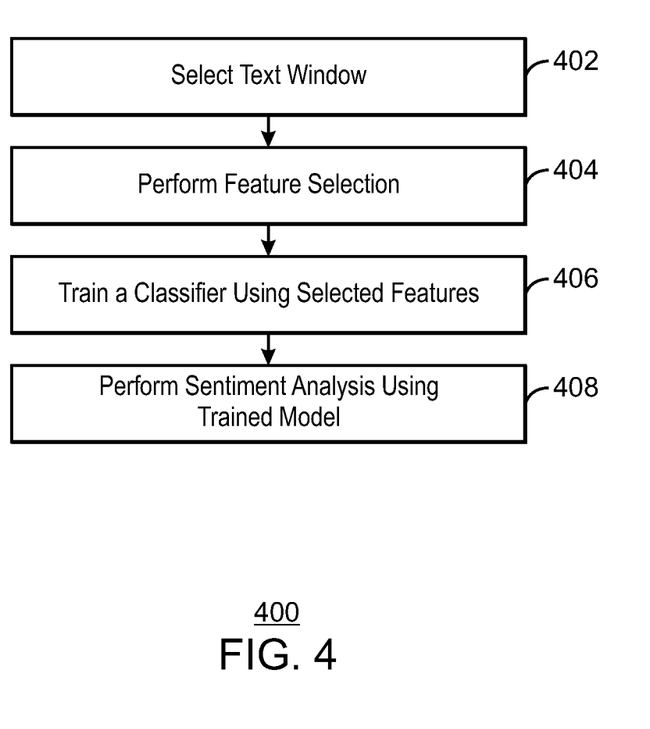
FIG. 4 is a process flow diagram for a method for sentiment analysis according to an embodiment of the present techniques.

FIG. 4 is a process flow diagram showing the computer-implemented method in block 312 for sentiment analysis on entities in newly identified microblogs according to an embodiment of the present techniques. The method 400 may be performed by the sentiment analyzer 118. It should be understood that the process flow diagram is not intended to indicate a particular order of execution.

The method 400 begins at block 402, where the sentiment analyzer 118 selects a text window for each entity in the training data, which contains entity-depend learning features. The training data is result of block 308. The text window may include the verbs, adjectives, adverbs, nouns, or other tokens that surround the entity. In one embodiment, the text window is a size of eight tokens.

At block 406, the sentiment analyzer 118 may train the classifier using the selected features. A trained model may be generated by training the classifier. At block 408, the sentiment analyzer 118 may perform sentiment analysis on newly identified microblogs in block 309 or a new set of input microblogging data using the trained model.

Figure 5:
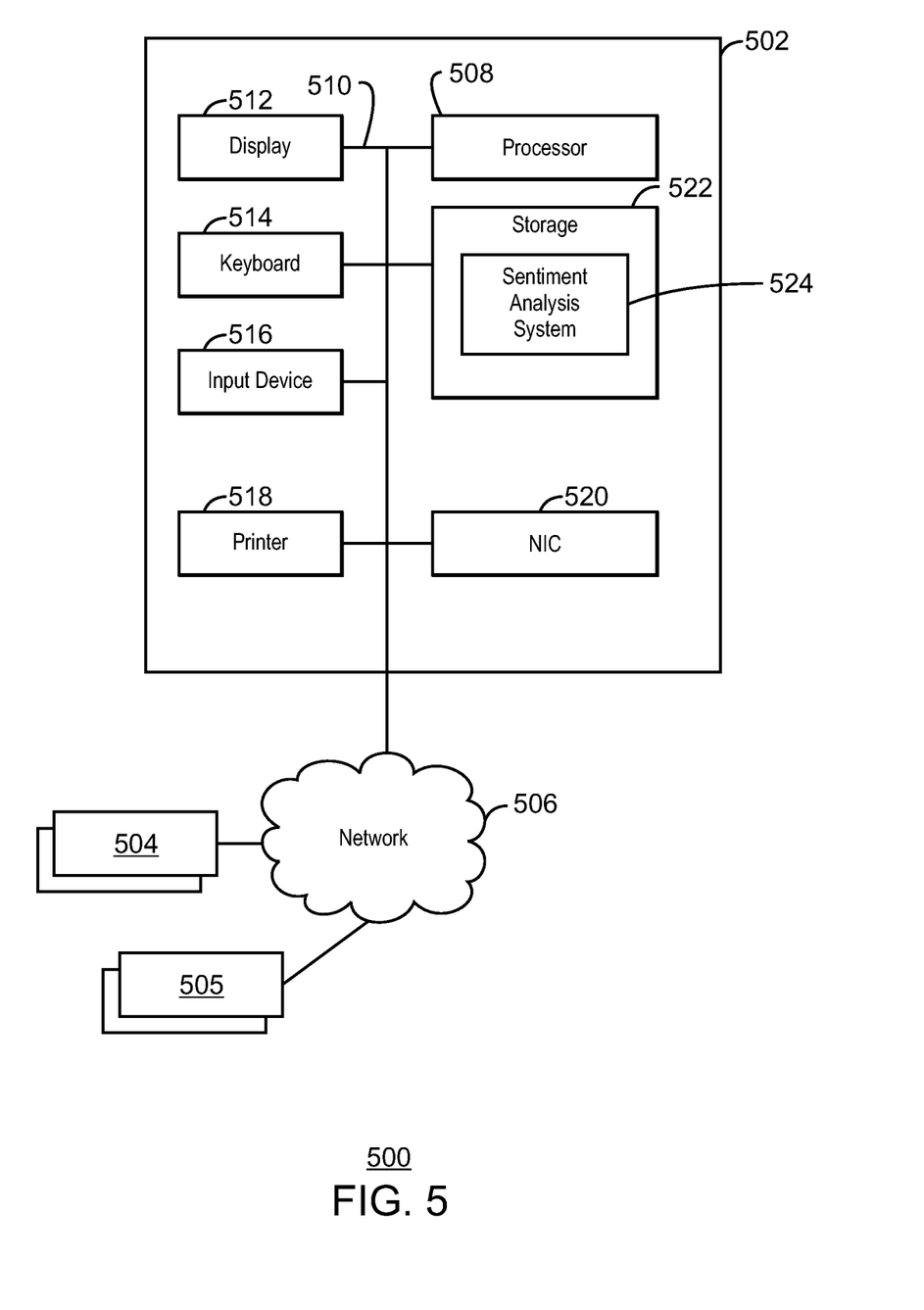
FIG. 5 is a block diagram of a system for sentiment analysis in accordance with an embodiment of the present techniques.

FIG. 5 is a block diagram of a system 500 for performing sentiment analysis in accordance with an embodiment of the present techniques. The functional blocks and devices shown in FIG. 5 may comprise hardware elements, software elements, or some combination of software and hardware. The hardware elements may include circuitry. The software elements may include computer code stored as machine-readable instructions on a non-transitory, computer-readable medium. Additionally, the functional blocks and devices of the system 500 are but one example of functional blocks and devices that may be implemented in an example. Specific functional blocks may be defined based on design considerations for a particular electronic device.

The system 500 may include an application server 502, in communication with clients 504, and microblog sources 505, over a network 506. The application server 502 may perform sentiment analysis on microblog data acquired from the microblog sources 505. The clients 504 may be used to request and view the results of sentiment analysis about various topics. The microblog sources 505 may include live streams, crawled content, and targeted content. The microblog sources 505 may be available to the application server 502 via HTTP connections. In the case of live streams, a real-time, persistent connection may be used. In the case of crawled content, an application program interface (API) may be used to access this microblogging data.

The application server 502 may include a processor 508, which may be connected through a bus 510 to a display 512, a keyboard 514, an input device 516, and an output device, such as a printer 518. The processor 508 can include a single core, a multiple core, or a processor in a computing cluster, among others. The input devices 516 may include devices such as a mouse or touch screen. The application server 502 may also be connected through the bus 510 to a network interface card 520. The network interface card 520 may connect the computational nodes 502 to the network 506. The network 506 may be a local area network, a wide area network, such as the Internet, or another network configuration. The network 506 may include routers, switches, modems, or any other kind of interface device used for interconnection. In one example, the network 506 may be the Internet.

The application server 502 may have other units operatively coupled to the processor 512 through the bus 510. These units may include non-transitory, computer-readable storage media, such as storage 522. The storage 522 may include media for the long-term storage of operating software and data, such as hard drives. The storage 522 may also include other types of non-transitory, computer-readable media, such as read-only memory and random access memory. The storage 522 may include the machine readable instructions used to implement the methods discussed herein. In an example, the storage 522 includes a sentiment analysis system 524. The sentiment analysis system 524 may perform sentiment analysis on data from the microblog sources 505. Further, the sentiment analysis system 524 may provide the client 504 with visualizations of the results of the sentiment analysis.

Figure 6:
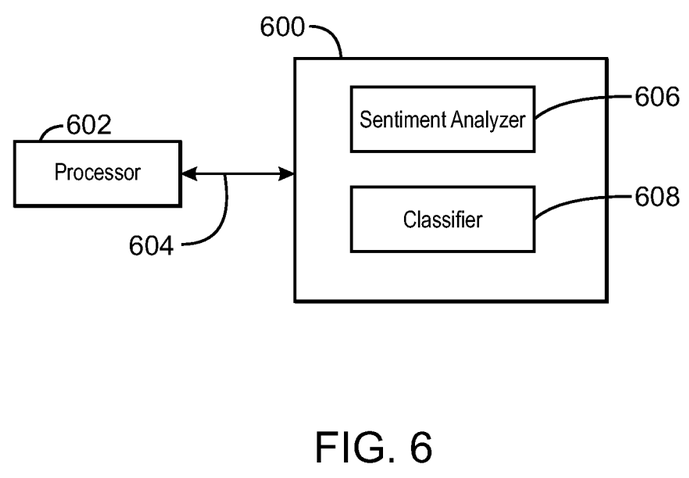
FIG. 6 is a block diagram showing a tangible, machine-readable medium that stores code adapted to perform sentiment analysis according to an exemplary embodiment of the present techniques.

FIG. 6 is a block diagram showing a tangible, machine-readable medium 600 that stores code adapted to perform sentiment analysis according to an exemplary embodiment of the present techniques. The tangible, machine-readable medium 600 may correspond to any typical storage device that stores computer-implemented instructions, such as programming code or the like. Moreover, tangible, machine-readable medium 600 may be included in the storage 522 shown in FIG. 5. When read and executed by a processor 602, the instructions stored on the tangible, machine-readable medium 600 are adapted to cause the processor 602 to perform sentiment analysis.

The tangible, machine-readable medium 600 stores a sentiment analyzer 606 and a sentiment classifier 608. The sentiment analyzer 606 first determines opinions on various entities discussed in microblogs by lexicon-based methods. Then using the classifier 608, it may be a machine learning system that is trained to perform sentiment analysis on entities in microblogs which cannot determined by lexicon-based methods. Its training data is generated through the lexicon-based methods.

What is claimed is:

1. A computer-implemented method of performing sentiment analysis, comprising:
   performing a first sentiment analysis on microblogging data based on a method using an opinion lexicon that includes non-domain-specific opinion terms, to generate first training data;
   training a classifier using the first training data;
   identifying a new opinion term in the microblogging data, by performing a statistical test on results of the first sentiment analysis on the microblogging data, wherein the new opinion term is domain-specific to the microblogging data and is not in the opinion lexicon;
   adding the new opinion term to the opinion lexicon to grow the opinion lexicon so that the opinion lexicon includes domain-specific opinion terms;
   identifying new microblogging data other than the microblogging data on which the first sentiment analysis has been performed, based on the opinion lexicon to which the new opinion term has been added;
   performing a second sentiment analysis on the new microblogging data using the classifier to generate second training data; and
   retraining the classifier as has been trained using the first training data, using the second training data to improve the classifier.

2. The method recited in claim 1, wherein training the classifier comprises:
   selecting a text window comprising an entity of a microblog;
   selecting one or more features from the text window; and
   training the classifier to determine a sentiment polarity for the entity.

3. The method recited in claim 2, wherein the text window comprises one or more surrounding words associated with the entity, and wherein the selected features are selected from the surrounding words.

4. The method recited in claim 1, wherein the statistical test comprises a Pearsons chi-square method, and wherein the opinion term comprises a Pearsons chi-square value greater than a specified threshold.

5. The method recited in claim 1, wherein the classifier comprises a support vector machine.

6. A computer system for performing sentiment analysis, the computer system comprising:
- a processor that is adapted to execute stored instructions; and
- a memory device that stores instructions, the memory device comprising:
- computer-implemented code adapted to perform a first sentiment analysis on microblogging data based on an opinion lexicon that includes non-domain-specific opinion terms, to generate first training data;
- computer-implemented code adapted to train a classifier using the first training data;
- computer-implemented code adapted to perform a statistical test on results of the first sentiment analysis on the microblogging data to identify a new opinion term, the new opinion term being domain-specific to the microblogging data;
- computer-implemented code adapted to add the new opinion term to the opinion lexicon to grow the opinion lexicon so that the opinion lexicon includes domain-specific opinion terms;
- computer-implemented code adapted to identify new microblogging data other than the microblogging data on which the first sentiment analysis has been performed, based on the opinion lexicon to which the new opinion term has been added;
- computer-implemented code adapted to perform a second sentiment analysis on the new microblogging data using the classifier to generate second training data; and
- computer-implemented code adapted to retrain the classifier as has been trained using the first training data, using the second training data to improve the classifier.

7. The computer system recited in claim 6, wherein the computer-implemented code adapted to train the classifier comprises computer-implemented code adapted to:
- identify the new opinion term and microblogging data based on a Pearsons chi-square value;
- select a text window comprising an entity of the new microblogging data;
- select one or more features from the text window; and
- train the classifier to determine a sentiment polarity for the entity.

8. The computer system recited in claim 7, wherein the new opinion terms comprise a Pearsons chi-square value greater than a specified threshold.

9. The computer system recited in claim 7, wherein the text window comprises one or more surrounding words associated with the topic, and wherein the selected features are selected from the surrounding words.

10. The computer system recited in claim 6, wherein the classifier comprises a support vector machine.

11. The computer system recited in claim 6, further comprising computer-implemented code adapted to:
- train a classifier using training data from the second sentiment analysis;
- identify additional microblogging data using the statistical test; and
- perform a third sentiment analysis on the additional microblogging data using the classifier.

12. A non-transitory machine-readable medium that stores machine-readable instructions executable by a processor to perform sentiment analysis, the machine-readable instructions comprising:
- machine-readable instructions that, when executed by the processor, perform a first sentiment analysis on microblogging data based on an opinion lexicon that includes non-domain-specific opinion terms, to generate first training data;
- machine-readable instructions that, when executed by the processor, train a classifier using the first training data;
- machine-readable instructions that, when executed by the processor, identify a new opinion term in the microblogging data, by at least performing a statistical test on results of the first sentiment analysis on the microblogging data, the new opinion term being domain-specific to the microblogging data;
- machine-readable instructions that, when executed by the processor, add the new opinion term to the opinion lexicon to grow the opinion lexicon so that the opinion lexicon includes domain-specific opinion terms;
- machine-readable instructions that, when executed by the processor, identify new microblogging data other than the microblogging data on which the first sentiment analysis has been performed, based on the opinion lexicon to which the new opinion term has been added;
- machine-readable instructions that, when executed by the processor, perform a second sentiment analysis on the new microblogging data using the classifier to generate second training data; and
- machine-readable instructions that, when executed by the processor, retrain the classifier as has been trained using the first training data, using the second training data to improve the classifier.

13. The non-transitory machine-readable medium recited in claim 12, wherein the machine-readable instructions that train the classifier comprise machine-readable instructions that, when executed by the processor:
- select a text window comprising an entity of the microblogging data;
- select one or more features from the text window to train the classifier to determine a sentiment polarity for the entity.

14. The non-transitory machine-readable medium recited in claim 13, wherein the new opinion term has a Pearsons chi-square value greater than a specified threshold.

15. The non-transitory machine-readable medium recited in claim 13, wherein the text window comprises one or more words associated with the entity, and wherein the selected features are selected from the one or more words.

* * * * *